US007668655B2

(12) United States Patent
Soehren

(10) Patent No.: US 7,668,655 B2
(45) Date of Patent: Feb. 23, 2010

(54) NAVIGATION COMPONENT MODELING SYSTEM AND METHOD

(75) Inventor: Wayne A. Soehren, Wayzata, MN (US)

(73) Assignee: Honeywell International Inc., Morristown, NJ (US)

( * ) Notice: Subject to any disclaimer, the term of this patent is extended or adjusted under 35 U.S.C. 154(b) by 809 days.

(21) Appl. No.: 11/006,985

(22) Filed: Dec. 7, 2004

(65) Prior Publication Data

US 2006/0122775 A1 Jun. 8, 2006

(51) Int. Cl.
*G01C 21/20* (2006.01)
(52) U.S. Cl. .................. 701/220; 701/221; 342/357.01; 342/357.12; 342/357.14; 340/988
(58) Field of Classification Search ................ 701/220, 701/221; 342/357.01, 357.12, 357.14; 340/988
See application file for complete search history.

(56) References Cited

U.S. PATENT DOCUMENTS

| 5,894,323 | A | 4/1999 | Kain et al. | |
|---|---|---|---|---|
| 6,175,807 | B1 | 1/2001 | Buchler et al. | |
| 6,311,129 | B1 | 10/2001 | Lin | |
| 6,408,245 | B1 | 6/2002 | An et al. | |
| 6,427,122 | B1 * | 7/2002 | Lin | 701/214 |
| 6,459,990 | B1 | 10/2002 | McCall et al. | |
| 6,512,976 | B1 * | 1/2003 | Sabatino et al. | 701/207 |
| 6,535,833 | B1 * | 3/2003 | Syrjarinne | 702/150 |
| 6,609,080 | B1 * | 8/2003 | Syrjarinne | 702/150 |
| 6,697,736 | B2 | 2/2004 | Lin | |
| 6,961,685 | B2 * | 11/2005 | Sy | 703/2 |
| 7,260,501 | B2 * | 8/2007 | Pattipatti et al. | 702/183 |
| 2002/0128775 | A1 | 9/2002 | Brodie et al. | |
| 2002/0177951 | A1 * | 11/2002 | Syrjarinne | 701/213 |
| 2003/0084704 | A1 | 5/2003 | Hanse | |
| 2003/0107514 | A1 * | 6/2003 | Syrjarinne et al. | 342/357.06 |
| 2003/0216865 | A1 | 11/2003 | Riewe et al. | |
| 2004/0012522 | A1 | 1/2004 | Groves | |
| 2004/0036261 | A1 | 2/2004 | Breed | |
| 2004/0073360 | A1 | 4/2004 | Foxlin | |
| 2004/0259651 | A1 | 12/2004 | Storek | |
| 2008/0246653 | A1 * | 10/2008 | Lin et al. | 342/357.06 |

FOREIGN PATENT DOCUMENTS

| WO | WO--02/099453 | 12/2002 |
|---|---|---|
| WO | WO 02/099453 | * 12/2002 |

OTHER PUBLICATIONS

Foxlin, E, "Inertial head-tracker sensor fusion by a complementary separate-bias Kalman filter," Virtual Reality Annual International Symposium, 1996. Proceedings of the 1996 Santa Clara, CA, USA Mar. 30-Apr. 3, 1996, Los Alamitos, CA, USA, IEEE Comput. Soc, US, Mar. 30, 1996, pp. 185-194, 267, XP01057063, ISBN 0-8186-7295-1, p. 191-p. 192.

\* cited by examiner

*Primary Examiner*—Khoi Tran
*Assistant Examiner*—Nikhil Sriraman
(74) *Attorney, Agent, or Firm*—Fogg & Powers LLC

(57) ABSTRACT

An inertial navigation system includes a navigation component, such as an inertial measurement unit, a processor in communication with the navigation component, and a filter embedded in computer code implemented within the processor. The filter includes a model of the navigation component, and one or more parameters of the model are configured after startup of the inertial navigation system based upon performance characteristics of the individual navigation component included in the inertial navigation system.

25 Claims, 2 Drawing Sheets

NAVIGATION COMPONENT MODELING SYSTEM AND METHOD

TECHNICAL FIELD

This application relates in general to navigation systems and, more specifically, to systems and methods for modeling components of such navigation systems.

BACKGROUND

Navigation systems, such as an inertial navigation system (INS), can be found on a wide variety of mobile objects, such as, for example, commercial aircraft, military aircraft, weapons systems, and vehicles such as automobiles, railcars including locomotives, and marine vessels. Such navigation systems typically include a number of components, such as an inertial measurement unit (IMU) and a global positioning system (GPS), which generate navigation data and communicate with a navigation processor.

Many navigation systems also include a filter, such as a Kalman filter, which can compare the output of one navigation component, such as an IMU, with that of other navigation components, such as a GPS, to ensure that the components are functioning properly and to improve the overall accuracy of the navigation system. Such a filter often includes embedded models of the navigation components within the system. These models provide the filter with an indication of the characteristics and accuracy of the navigation components.

The component models embedded in a filter are often generalized, meaning that a single model is typically intended to represent the characteristics of an entire family of similar components. In many cases, such generalized models can dramatically limit the performance of the filter. Accordingly, a need exists for a way to adopt more specific models of navigation components within a filter.

SUMMARY OF THE INVENTION

The above-mentioned drawbacks associated with existing navigation component modeling systems are addressed by embodiments of the present invention and will be understood by reading and studying the following specification.

In one embodiment, an inertial navigation system comprises a navigation component, a processor in communication with the navigation component, a filter embedded in computer code implemented within the processor. The filter comprises a model of the navigation component, and one or more parameters of the model are configured after startup of the inertial navigation system based upon performance characteristics of the individual navigation component included in the inertial navigation system.

In another embodiment, a method of configuring a navigation component model in a filter of an inertial navigation system comprises, after startup of the inertial navigation system, receiving calibration data regarding the individual navigation component included in the inertial navigation system. The method further comprises individually configuring a model customized for the individual navigation component in the filter of the inertial navigation system based upon the received calibration data.

In another embodiment, a method of configuring a navigation component model in a filter of an inertial navigation system comprises, after startup of the inertial navigation system, receiving data regarding a performance category into which the navigation component fits. The performance category is based upon characteristics measured during a preceding calibration procedure of the individual navigation component included in the inertial navigation system. The method further comprises selecting one of a plurality of preconfigured navigation component models, wherein the selected model corresponds to the performance category of the navigation component.

The details of one or more embodiments of the claimed invention are set forth in the accompanying drawings and the description below. Other features and advantages will become apparent from the description, the drawings, and the claims.

BRIEF DESCRIPTION OF THE DRAWINGS

Like reference numbers and designations in the various drawings indicate like elements.

DETAILED DESCRIPTION OF THE PREFERRED EMBODIMENT

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the spirit and scope of the present invention. The following detailed description is, therefore, not to be taken in a limiting sense.

Figure 1:
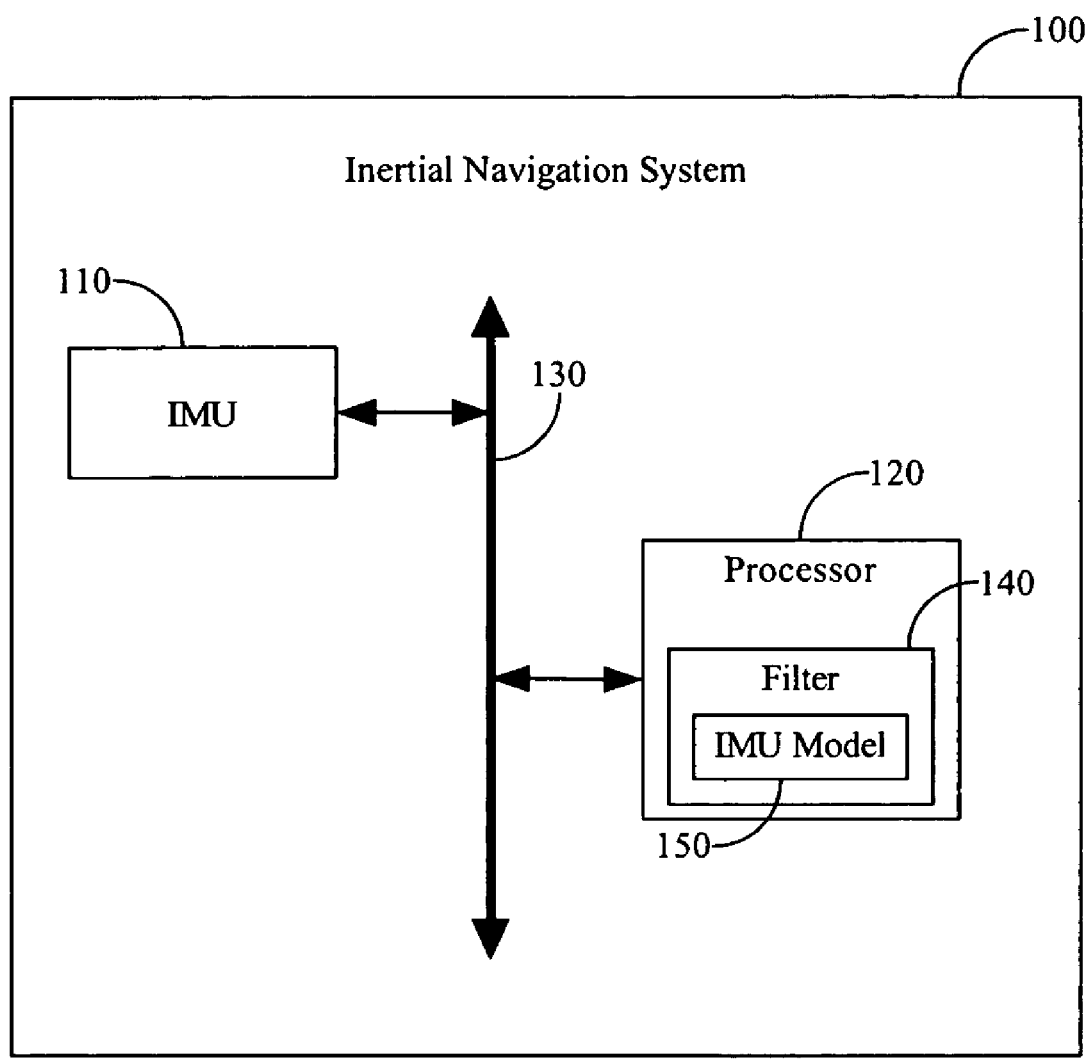
FIG. 1 is a schematic of one embodiment of an inertial navigation system.

FIG. 1 is a block diagram of one embodiment of an inertial navigation system (INS) 100. In the illustrated embodiment, the INS 100 comprises an inertial measurement unit (IMU) 110, which communicates with a processor 120 via a data bus 130. The INS 100 also comprises a filter 140, such as a Kalman filter, which includes an IMU model 150. The filter 140 is embedded in computer code implemented within the processor 120. Those of ordinary skill in the art will understand that the INS 100 may include numerous additional or alternative components, depending on the application, such as, for example, a global positioning system (GPS), barometric altimeter, radar altimeter, magnetometer, Doppler velocimeter, etc., which for simplicity, are not illustrated in FIG. 1.

While the following description refers primarily to an IMU 110 as one exemplary embodiment, the systems and methods described herein can be readily adapted and applied to other navigation components, such as those listed above, that may be modeled in an INS 100. For example, a GPS component has an oscillator that is typically modeled in the filter 140. In conventional systems, a generic model of the GPS oscillator is often used, because specific information about the oscillator is not typically made available to other components of the INS 100. Using the systems and methods described below, however, a detailed model of the particular oscillator included in the GPS could be used, which could significantly improve system performance.

In operation, the IMU 110 broadcasts a "guidance message" at a given frequency (e.g., 100 Hz or 600 Hz) to the processor 120 over the data bus 130. In some embodiments, the guidance message is transmitted in accordance with a standard protocol, such as the synchronous data link control (SDLC) protocol or the advanced medium range air to air missile (AMRAAM) protocol. The guidance message typically comprises a header portion including an IMU identifier and a data portion including the change in navigational data reported by the IMU 110 (e.g., $\Delta v$, $\Delta \theta$) since the last guidance message. The IMU identifier portion of the guidance message typically indicates only the IMU family to which the IMU 110 belongs. For example, the IMU identifier might indicate that the IMU 110 belongs to the HG1700, HG1900, or HG1920 family of IMUs manufactured by Honeywell International, Inc.

In a conventional INS 100, a single IMU model 150 is associated with each family of IMUs that may be included in the INS 100. The filter 140 typically selects the appropriate IMU model 150 based on the IMU identifier portion of the guidance message broadcast by the IMU 110. In many cases, however, there can be wide variations in performance among individual IMUs 110 within the same IMU family. Such variations in performance can be caused by a number of factors, such as, for example, inherent variations in the IMU manufacturing process or refinements to a given IMU family due to ongoing research and development. As a result of these significant variations in performance, the filter 140 of a conventional INS 100 often must utilize an IMU model 150 that is not optimized for the particular IMU 110 that is actually included in the INS 100.

Unlike conventional systems, the IMU model 150 utilized in embodiments of the present invention is more specific to the IMU 110 included in the INS 100. For example, in some embodiments, each IMU model 150 is configured individually based on specific performance parameters which are measured and stored in the memory of each individual IMU 110 a priori as part of a detailed calibration procedure performed during the standard manufacturing process. In other embodiments, numerous IMU models 150 are pre-configured in advance, and an appropriate IMU model 150 is selected based upon the IMU-specific calibration data rather than upon generic information about the family to which the IMU 110 belongs, as in conventional systems. Accordingly, in embodiments of the present invention, the IMU model 150 utilized by the filter 140 is more specifically tailored to the particular IMU 110 actually included in the INS 100, and the performance of the filter 140 can be dramatically improved as a result.

Figure 2:
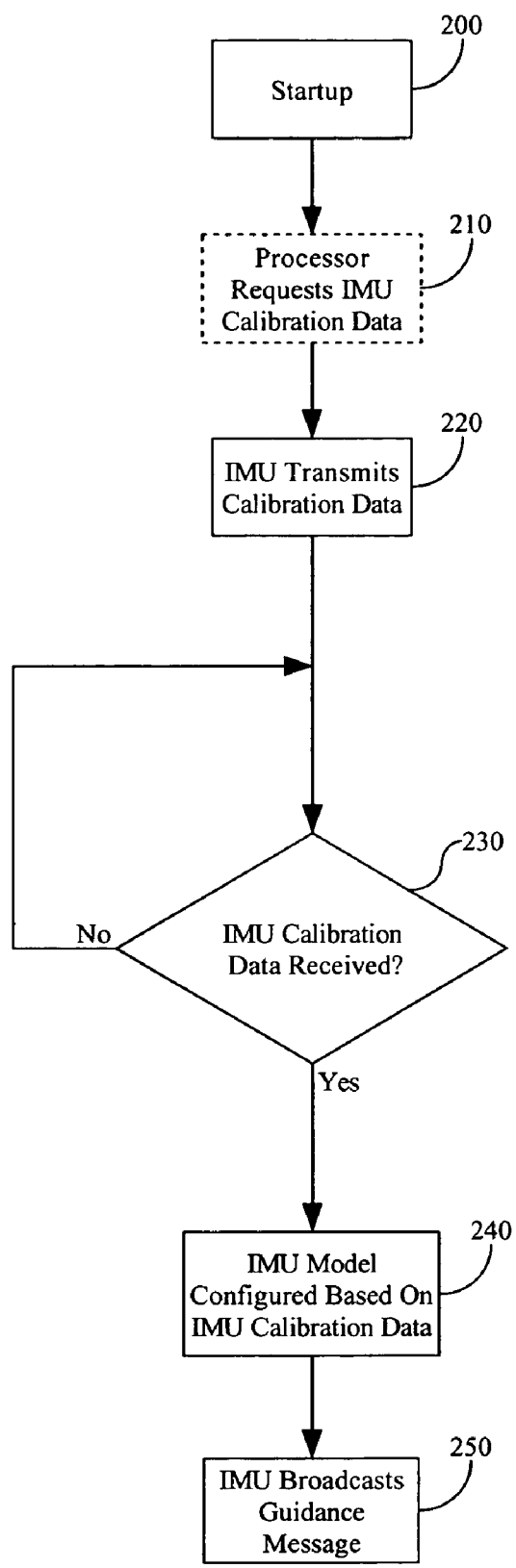
FIG. 2 is a flow chart illustrating a method for configuring an IMU model in accordance with embodiments of the present invention.

FIG. 2 is a flow chart illustrating a method for configuring an IMU model 150 in accordance with embodiments of the present invention. In a first step 200, the INS 100 starts up. In a next step 210, which is optional, the processor 120 requests the IMU 110 to transmit the specific performance parameters measured and stored in the IMU 100 as part of the standard calibration procedure. Examples of common performance parameters measured during this procedure include gyroscope bias offsets, accelerometer bias offsets, scale factor offsets, g sensitivity, sensor misalignment, non-orthogonality, etc. These performance parameters, which are stored in the memory of the IMU 110 as a series of coefficients, correspond to the parameters of certain states of the IMU model 150 embedded in the filter 140. Step 210 is optional because, in some embodiments, the IMU 110 itself is configured to transmit the calibration data upon startup, rather than waiting for a request from the processor 120. In these embodiments, step 210 is unnecessary.

In a step 220, the IMU 110 transmits the calibration data to the processor 120 over the data bus 130. In some embodiments, this step involves transmitting all of the calibration coefficients to the processor 120. In other embodiments, the IMU 110 is characterized as falling into one of a plurality of predefined performance categories (based on its calibration data), and step 220 involves transmitting the performance category of the IMU 110 to the processor.

In a step 230, a determination is made as to whether the IMU calibration data (or performance category) has been received by the processor 120. If not, then the IMU 110 continues to transmit the data until it is successfully received. Then, in a step 240, the IMU model 150 embedded in the filter 140 is configured based on the calibration data received from the IMU 110. As discussed above, in some embodiments, this step involves individually configuring a customized IMU model 110 designed to match the calibration data of the IMU 110. For example, the calibration coefficients received from the IMU 110 can be analyzed by a software application to develop parameters for the appropriate states of the IMU model 150 corresponding to the calibration coefficients of the IMU 110. In other embodiments, step 240 involves selecting an appropriate pre-configured IMU model 150 based upon the performance category of the IMU 110. In a final step 250, the IMU 110 begins broadcasting the standard guidance message at the appropriate frequency and in accordance with the appropriate protocol.

The systems and methods described above present a number of distinct advantages over conventional approaches. For example, unlike conventional systems, the IMU model 150 utilized in embodiments of the present invention can be specifically customized to the particular IMU 110 actually included in the INS 100. As a result, the filter 140 can be advantageously optimized for the individual IMU 110, and the performance of the filter 140 can be significantly enhanced.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. An inertial navigation system, comprising:
a navigation component;
a processor in communication with the navigation component; and
a filter embedded in computer code implemented within the processor, wherein the filter comprises a model of the navigation component, and one or more parameters of the model are configured after startup of the inertial navigation system based upon performance characteristics of the navigation component included in the inertial navigation system, the performance characteristics comprising data measured during a calibration procedure;
wherein the performance characteristics comprise one or more of gyroscope bias offsets, accelerometer bias offsets, scale factor offsets, g sensitivity, sensor misalignment, or non-orthogonality.

2. The inertial navigation system of claim 1, wherein the navigation component comprises an inertial measurement unit.

3. The inertial navigation system of claim 1, wherein the navigation component comprises a global positioning system.

4. The inertial navigation system of claim 1, wherein the navigation component comprises a barometric altimeter.

5. The inertial navigation system of claim 1, wherein the navigation component comprises a radar altimeter.

6. The inertial navigation system of claim 1, wherein the navigation component comprises a magnetometer.

7. The inertial navigation system of claim 1, wherein the navigation component comprises a Doppler velocimeter.

8. The inertial navigation system of claim 1, wherein the filter comprises a Kalman filter.

9. A method of configuring a navigation component model in a filter of an inertial navigation system, the method comprising:
   after startup of the inertial navigation system, receiving calibration data regarding the navigation component included in the inertial navigation system, the received calibration data comprising a plurality of coefficients measured during a preceding calibration procedure and stored in a memory of the navigation component; and
   individually configuring a model customized for the navigation component in the filter of the inertial navigation system for a plurality of predefined performance categories based upon the received calibration data, wherein the calibration data comprises one or more of gyroscope bias offsets, accelerometer bias offsets, scale factor offsets, g sensitivity, sensor misalignment, or non-orthogonality.

10. The method of claim 9, wherein the navigation component comprises an inertial measurement unit.

11. The method of claim 9, wherein the navigation component comprises a global positioning system.

12. The method of claim 9, wherein the navigation component comprises a barometric altimeter.

13. The method of claim 9, wherein the navigation component comprises a radar altimeter.

14. The method of claim 9, wherein the navigation component comprises a magnetometer.

15. The method of claim 9, wherein the navigation component comprises a Doppler velocimeter.

16. The method of claim 9, wherein the filter comprises a Kalman filter.

17. The method of claim 9, wherein individually configuring the model comprises analyzing the calibration data with a software application to develop parameters for one or more states of the model corresponding to the calibration data.

18. A method of configuring a navigation component model in a filter of an inertial navigation system, the method comprising:
   after startup of the inertial navigation system, receiving data regarding a performance category into which the navigation component fits, wherein the performance category is based upon characteristics measured during a preceding calibration procedure of the navigation component included in the inertial navigation system, wherein the characteristics measured during the preceding calibration procedure comprise one or more of gyroscope bias offsets, accelerometer bias offsets, scale factor offsets, g sensitivity, sensor misalignment, or non-orthogonality; and
   selecting one of a plurality of pre-configured navigation component models, wherein the selected model corresponds to the performance category of the navigation component.

19. The method of claim 18, wherein the navigation component comprises an inertial measurement unit.

20. The method of claim 18, wherein the navigation component comprises a global positioning system.

21. The method of claim 18, wherein the navigation component comprises a barometric altimeter.

22. The method of claim 18, wherein the navigation component comprises a radar altimeter.

23. The method of claim 18, wherein the navigation component comprises a magnetometer.

24. The method of claim 18, wherein the navigation component comprises a Doppler velocimeter.

25. The method of claim 18, wherein the filter comprises a Kalman filter.

* * * * *

UNITED STATES PATENT AND TRADEMARK OFFICE
CERTIFICATE OF CORRECTION

| | | |
|---|---|---|
| PATENT NO. | : 7,668,655 B2 | Page 1 of 1 |
| APPLICATION NO. | : 11/006985 | |
| DATED | : February 23, 2010 | |
| INVENTOR(S) | : Wayne A. Soehren | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1423 days.

Signed and Sealed this

Seventh Day of December, 2010

David J. Kappos
*Director of the United States Patent and Trademark Office*